United States Patent [19]
Ogawa et al.

[11] 3,890,312
[45] June 17, 1975

[54] STABILIZATION AND PURIFICATION OF β-LACTONES

[75] Inventors: Yasuhiro Ogawa, Suita; Norio Awata, Settsu, both of Japan

[73] Assignee: Kanegafuchi Boseki Kabushiki Kaisha, Japan

[22] Filed: Oct. 30, 1969

[21] Appl. No.: 872,727

[30] Foreign Application Priority Data
Oct. 30, 1968 Japan............................... 43-79537
Feb. 4, 1969 Japan............................... 44-8332

[52] U.S. Cl. ............................................ 260/343.9
[51] Int. Cl................................................ C07d 3/00
[58] Field of Search.................................. 260/343.9

[56] References Cited
UNITED STATES PATENTS
2,759,003   9/1956   Jansen et al. ..................... 260/343.9
3,511,855   5/1970   Merger et al. ..................... 260/343.9

*Primary Examiner*—Donald G. Daus
*Assistant Examiner*—Anne Marie T. Tighe
*Attorney, Agent, or Firm*—Wenderoth, Lind & Ponack

[57] ABSTRACT

A process for the purification of β-lactones by contacting said lactones with metal or non-metal oxides, potassium permanganate or potassium permanganate in admixture with other metal salts.

13 Claims, No Drawings

STABILIZATION AND PURIFICATION OF β-LACTONES

This invention relates to the purification of β-lactones.

As known, β-lactones are produced by (1) the thermal decomposition of a β-acylocy-α, α-dialkylpropionic acid, (2) the synthesis of α-2 substituted propionic acid from a corresponding α-olefin, followed by chlorination and subsequent ring formation or (3) the reaction of a ketone with formaldehyde. However, in these processes, the product β-lactone contains a slight or small amount of the unreacted material or a by-product.

For example, pivalolactone (α, α-dimethyl-β-propionic acid) produced by the thermal decomposition of β-acetoxy-α, α-dimethylpropionic acid contains a small amount of acetic acid, aldehyde and water. Further, pivalolactone produced through isobutylene → pivalic acid → β-monochloropivalic acid → pivalolactone contains a small amount of α-di-substituted propionic acid or its chlorinate and a chlorinate of an β-olefin. Further, β-propiolactone obtained by the reaction of ketene with formaldehyde contains a small amount of unreacted formaldehyde and ketene and also an acid hydride.

A β-lactone containing such impurities as water, carboxylic acid, akdehyde, chlorinated olefine, ketene, olefin, etc., is remarkably limited in its industrial uses due to the presence of such impurities.

It is well known, for example, that, in producing a polypivalolactone by polymerizing pivalolactone, even if a slight amount of impurities is present in the pivalolactone, the impurities act as a polymerization inhibitor or chain transfer agent so that it is difficult to obtain a polypivalolactone of a high molecular weight. Particularly, those impurities which are comparatively close in the boiling point to that of pivalolactone are difficult to remove by usual rectification. Therefore, the separation and removal of these impurities is an issential requirement for the production of a polypivalolactone of a high molecular weight.

For the purification of pivalolactone, there has been proposed, in addition to rectification, a method wherein a substance which will bind water present in pivalolactone, such as polyphosphoric acid or calcium hydride or an adsorptive substance such as, for example, an ion exchange resin is added. There has also been proposed a method wherein an isocyanate and a catalyst for producing polyurethanes are added to pivalolactone and the mixture is heated (British Pat. No. 1,087,287 ). However, in the former method, the effect of the purification is not sufficient and, in the latter method, particularly, in order to attain the purity required to obtain a high polymer, a severe treatment for a long time must be carried out and therefore there is caused a loss of pivalolactone due to its polymerization.

Further, in order to purify pivalolactone with only distillation, the distillation must be carried out at a slow speed and must be repeated many times, but a satisfactorily high purity is difficult to obtain.

We have found that impurities contained in β-lactones can be industrially easily and smoothly separated and removed by bringing a commercial or industrially obtained β-lactone represented by the general formula

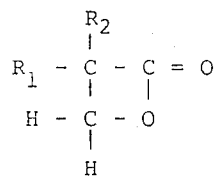

wherein each of $R_1$ and $R_2$ represents hydrogen or an alkyl or aryl group, into contact with at least one selected from the group consisting of metal oxide, nonmetal oxide, potassium permanganate and a mixture of potassium permanganate and at least one metal salt. These substances with which β-lactones are to be contacted according to this invention will sometimes be referred to as "treating agents" hereinafter.

The term "bringing into contact," or the like as used in this specification means to keep a β-lactone in a liquid state in contact with the above mentioned treating agent for a short time (temporarily) or a long time (such as throughout storing).

The β-lactone to be used in the purification method of this invention is the one represented by the above general formula and containing impurities which act as a polymerization inhibitor, chain transfer agent or polymerization accelerator for the β-lactone.

Examples of β-lactones represented by the above general formula are β-propiolactone, α, α-dimethyl β-propiolactone, α, α-diethyl β-propiolactone, α, α-dipropyl β-propiolactone, α, α-dibutyl β-propiolactone, α-methyl- α-ethyl β-propiolactone, α-methyl α-propyl β-propiolactone, α-methyl α-butyl β-propiolactone, α-ethyl α-propyl β-propiolaconte and α-diphenyl β-propiolactone.

The purification according to the invention is carried out by bringing a β-lactone containing such impurities as described above into contact with the treating agent. However, in the purification of a β-lactone containing carboxylic acid, aldehyde or ketene as the impurity, it is particularly preferable to employ a metal oxide or nonmetal oxide as the treating agent.

Preferable examples of the metal oxides to be used in the present invention are berylium oxide, magnesium oxide, calcium oxide, strontium oxide, barium oxide, lead monoxide, manganese oxide, cadmium oxide, tungsten dioxide, chromium trioxide, vanadium pentoxide, molybdenum trioxide, nickelous oxide, cuprous oxide, zinc oxide, aluminum oxide, antimony trioxide, stannous oxide, silverous oxide, red lead, ferric oxide, ceric oxide, zirconium oxide, bismuth trioxide and titanium dioxide.

As non-metal oxides are preferable boron oxide, silicon oxide, selenium oxide and arsenic dioxide.

These metal oxides or nonmetal oxides may be used alone or as a mixture of two or more of them. If desired a substance consisting of a metal oxide and nonmetal oxide such as silica-alumina, silica-zirconia, silica-boria, acid clay, bentonite, kaolin and montmorillonite can be used.

The amount of such treating agent may be varied over a wide range such as 0.05 to 100 % by weight, preferably 0.1 to 50 % by weight on the weight of the β-lactone.

The contact of a β-lactone with such metal oxide or nonmetal oxide may be effected in any suitable manner. For example, a β-lactone may be passed through a column filled with the treating agent in the form of powder, granules or small lumps, or filled with such carrier as pumice or glass grains on which is deposited the treating agent. Alternatively, a required amount of a powdery, granular, small lumpy, laminar (or any other form) metal oxide or nonmetal oxide is added to and mixed with a β-lactone and the mixture may be left standing. If desired the mixture is stirred inorder to reduce the time for effecting the purification. However, even in the absence of such stirring, by the diffusion of impurities, the purification can be attained. After the purification, the oxide may be separated by filtration.

It is also possible to provide a layer of the treating agent (oxide) on the inner wall of a tank by means of lining or surface oxidation and to store a β-lactone in the tank so that it contacts with the oxide layer and consequently is purified thereby. In this case, it would be unnecessary to conduct the separation of the treating agent after the purification.

The amount (based on the weight of the β-lactone) of the metal oxide or nonmetal oxide to be used in the present invention varies depending on its particular form and impurity content in the lactone or the mode of contact but is generally 0.05 to 100 % by weight, preferably 0.1 to 50% by weight.

The temperature at which β-lactone is contacted with the oxide may be −10° to 150°C., preferably 10° to 60°C.

When a β-lactone and the oxide are thus brought into contact with each other, impurities which are contained in the β-lactone and act as polymerization inhibitor or chain transfer agent in the polymerization of the β-lactone such as the above mentioned carboxylic acid, aldehyde or ketene, or active ion seeds (having a polymerization accelerating activity) formed during the storage of the β-lactone are absorbed thereby or removed by being inactivated or modified. Therefore, the resulting β-lactone shows a high purity and it is, in most cases, not necessary to subject to any further purification such as distillation. The above mentioned metal oxide or nonmetal oxide is a solid insoluble in β-lactones and high in the specific gravity. Therefore, after the treatment, it can be easily separated and removed by such simple operation as decantation or filtration.

Further the oxide to be used in the present invention is chemically inert ot β-lactones. Therefore, in the course of contact with β-lactone, the latter is not chemically modified or polymerized, and there is no loss of the β-lactone during the treatment.

Further, most of the metal oxides or nonmetal oxides to be used in the present invention do not adversely affect the polymerization of β-lactones and the properties of the resulting polymers. Therefore, if the purified β-lactone is to be polymerized, it is not always necessary to perfectly remove such oxide after the purification.

If desired, a β-lactone may be stored for a long period of time with the oxide added thereto, so that not only the purification but also the prevention of the polymerization during the storage may be effected.

The metal oxides and nonmetal oxides to be used in the present invention are chemically or thermally stable so that it is easy to handle and it is also possible to regenerate its activity for reuse after the use by simple calcination or the like.

Another mode of the purification method of the present invention is to contact potassium permanganate or a mixture of potassium permanganate and at least one metal salt with a β-lactone represented by the above indicated general formula and containing impurities.

This process is particularly useful in the purification of a β-lactone containing an oxidizable impurity which acts as a polymerization inhibitor or chain transfer agent for the β-lactone, such as an α-olefin, chlorinated olefin, for example, chlorinate of isobutylene such as 1,3- dichloro-2- methyl-1- propene, 3- chloro-2- chloromethyl-1- propene or 1,3,3- trichloro-2- methyl-1- propene or a chlorinate of 2- ethyl-1- butene, methyl styrene or its chlorinate, monochloropivalic acid, hydroxypivalic acid, α-phenyl α-methyl propionic acid or its chlorinate, ketene or ketene dimer or aldehyde.

As the metal salt to be used together with potassium permanganate, there may be mentioned cupric chloride, zinc chloride, cupric nitrate, zinc nitrate or bismuth nitrate. A mixture of such salts may also be used.

When pivalolactone is brought into contact with potassium permanganate or a mixture of potassium permanganate and the above mentioned inorganic salt(s), the above mentioned active impurity is inactivated by the oxidizing action of the potassium permanganate. Thus, potassium permanganate inactivates the active compound (the impurity) by its oxidizing action, and the alkali liberated from the potassium permanganate reacts with the organic acid in the above mentioned impurity to inactivate the same. Even if potassium permanganate is kept in contact at a temperature near the room temperature for about 2 days, it does not affect the β-lactone but selectively acts on the active impurities. However, under severe treating conditions, there is a tendency to cause some polymerization of the β-lactone during the purification step. In such case, it is preferable to employ a mixed system of potassium permanganate and said metallic salt(s). When such a mixture is used, even if kept in contact with β-lactone under severe conditions for a long time, it does not simultaneously cause polymerization of the β-lactone but the active impurities are selectively inactivated.

The above mentioned contact may be effected in any suitable manner. Thus, most simply, potassium permanganate crystals may be added to a β-lactone and the mixture may be left standing for a desired period of time. In this case, the time required for the purification can be reduced by agitating the mixture. However, even in the absence of agitation, a part of the potassium permanganate dissolves in the β-lactone and the object of the purification can be attained. Further, the purification may also be conducted by adding potassium permanganate or its mixture with said salt into the β-lactone, heating the mixture while passing air therethrough and then distilling the same.

The amount of potassium permanganate and said inorganic salt somewhat varies depending upon the impurity content in the lactone and also on the mode of contacting. However, usually, the amount of potassium permanganate is 0.01 to 10 %, preferably 0.1 to 1 % by weight based on the β-lactone. The proper amount of the inorganic salt is 0.01 to 10 %, preferably 0.1 to 5 % by weight based on the β-lactone.

The temperature for conducting the purification is related to the impurity content in the lactone and the time of purification, but is generally −10° to 150°C., preferably 10° to 60°C. The contacting time also varies depending on the impurity content, the amount of potassium permanganate and the contacting temperature but is generally 30 minutes to 5 days. For example, at the room temperature, it is 5 hours to 3 days. Further, at 40° to 60°C., it is 2 to 8 hours. Even when the β-lactone is brought into contact with a mixed system of potassium permanganate and said inorganic salt for a long period (more than 10 days), the β-lactone is not lost and therefore the purification can be effected during the storage of the lactone.

After the purification, the mixture may be flashdistilled, or the mixture may be filtered and then the β-lactone is fractionated by a simple distillation, to obtain β-lactone of a high purity.

The β-lactone purified by the method of the present invention can be easily and smoothly polymerized with such known catalyst as, for example, a quaternary ammonium compound, tertiary amine, organic acid salt, organometalic compound, phosphine, arsine, stibine organic sulfide compound or sulfonium compound so that a polymer of a high molecular weight can be obtained.

The invention will be further explained by means of the following Examples.

EXAMPLE 1

Chlorine gas was introduced into pivalic acid to carry out the chlorination to produce β-chloropivalic acid. Then β-chloropivalic acid was distilled under a reduced pressure and was then cyclized in an aqueous solution of sodium hydroxide. The reaction product was extracted with chloroform to obtain α, α-dimethyl β-propiolactone (simply referred to as pivalolactone hereinafter). The pivalolactone was isolated by distilling out the solvent. Then said chloroform solution was distilled at 50° to 60°C. under a reduced pressure of 15 mm. Hg. The gas chromatographic analysis (DOP 1 m., 90°C.) of the product after the distillation indicated that there is contained 0.5 % by weight of such impurity as pivalic acid.

To this impure pivalolactone was added 2.0 % by weight of each of powdery metal oxides and nonmetal oxides mentioned below and the mixture was stirred at 20°C. for 1 hour. Then the oxide was separated by filtration. In each case the gas chromatographic analysis indicated that the resulting β-lactone did not contain such impurity as pivalic acid.

As well known, impurities in β-lactones become an important factor in the production of a linear polyester of a high molecular weight by the polymerization of such lactone. Thus, when the polmerization of a β-lactone is conducted under the same conditions but by varying the impurity content, it will be absorbed that the molecular weight of the resulting polymer is influenced by the amount of the impurities present in the monomer.

Therefore, the polymerization of a β-lactone to a high molecular weight linear polyester is a very convenient measure to evaluate the purity of the β-lactone.

Thus, 2.0 g. of each pivalolactone purified as above, 2.0 g. of toluene and 3.9 mg. of tri-normal butylamine were charged into a test tube. The mixture was subjected to polymerization in a stationary state at 100°C. for 5 hours. (This is referred to as polymerization test.) The resulting polymer was washed with acetone and then dried. The polymer was dissolved in a mixed solvent of 6 parts by weight of phenol and 4 parts of weight of ortho-chlorophenol and the intrinsic viscosity was measured at 30°C. The results are shown in Table 1.

Table 1

| Oxide | Intrinsic viscosity (dl./g.) | Oxide | Intrinsic viscosity (dl./g.) |
| --- | --- | --- | --- |
| Not added | 2.21 | WO$_2$ | 3.75 |
| BeO | 5.82 | Cr$_2$O$_3$ | 3.46 |
| MgO | 4.23 | V$_2$O$_5$ | 4.62 |
| CaO | 4.98 | SrO | 4.83 |
| MnO | 4.65 | BaO | 4.72 |
| CdO | 4.65 | PbO | 5.90 |
| Al$_2$O$_3$ | 4.68 | B$_2$O$_3$ | 4.80 |
| Sb$_2$O$_3$ | 4.61 | ZnO | 4.54 |
| Mo$_2$O$_3$ | 4.51 | AS$_2$O$_3$ | 4.31 |
| Silica-alumina | 4.61 | Silica-boria | 4.49 |
| SeO$_2$ | 4.45 | TiO$_2$ | 4.59 |
| CuO | 4.48 | NiO | 4.60 |

As apparent from the above results, the oxides used in accordance with this invention have excellent purification effects and the purified β-lactone can easily be polymerized to a high molecular weight.

Further, during the above purification treatment, no formation of a polymer was observed.

EXAMPLE 2

The pivalolactone (containing the impurity) produced in Example 1 was purified by passing through a column filled with each of the oxides indicated in Table 2. In each case, the gas chromatographic analysis indicated that the resulting pivalolactone no more contains such impurity as pivalic acid. Further, a polymerization test was conducted in the same manner as in Example 1 to qualitatively determine the presence of purity. The results are shown in Table 2. By the way, for the column in the purification treatment, there was used at a glass tube of a charge layer length of 40 cm. and a diameter of 3 cm. having a cock in the lower part. Each oxide os the charge was of a granularity of 60 to 80 meshes. The velocity of the flow of the lactone at 20°C. through the cock in the lower part of the column was adjusted to be 10 c.c./minute.

Table 2

| Oxide | Intrinsic viscosity (dl./g.) | Oxide | Intrinsic viscosity (dl./g.) |
| --- | --- | --- | --- |
| None | 2.21 | MgO | 4.20 |
| PbO | 5.40 | WO$_2$ | 3.40 |
| BeO | 5.80 | Cr$_2$O$_3$ | 3.59 |
| CaO | 4.25 | V$_2$O$_5$ | 4.60 |
| MnO | 4.12 | SrO | 4.30 |
| CdO | 4.60 | BaO | 4.15 |
| Al$_2$O$_3$ | 4.70 | B$_2$O$_3$ | 4.60 |
| Sb$_2$O$_3$ | 4.65 | ZnO | 4.48 |
| Silica-alumina | 4.61 | Silica-boria | 4.45 |
| Mo$_2$O$_3$ | 4.50 | TiO$_2$ | 4.50 |
| SeO$_2$ | 4.45 | As$_2$O$_3$ | 4.30 |

Instead of the above mentioned impure pivalolacetone, α-phenyl- α-methyl propiolactone containing 0.5 % by weight α-phenyl- α-methyl propionic acid as impurity and α, α-diethyl- β-propiolactone containing 0.45 % by weight α, α-diethyl β-propionic acid as impurity were passed through the column under the same conditions as are mentioned above. It was confirmed that the resulting product in each case does no more contain such impurity.

EXAMPLE 3

β-propiolactone synthesized by the reaction of ketene and formaldehyde was dehydrated with calcium hydride and was distilled. The resulting β-propiolactone containing 0.2 % ketene dimer, 0.1 % formaldyhyde and 0.3 % acetic acid was tested by polymerization under the below mentioned conditions. As a result, a low molecular weight poly-β-propiolactone of an intrinsic viscosity of 0.05 was obtained.

On the other hand, an oxide in an amount of 0.5 % by weight based on the β-propiolactone was added and the mixture was left standing for 24 hours. Then the oxide was removed by filtration. When the thus purified β-propiolactone was polymerized, a poly β-propiolactone of a comparatively high molecular weight could be obtained. The results are shown in Table 3. Further, when the purified β-priopiolactone was analyzed with a gas chromatography, no presence of impurities was recognized in each case.

The above mentioned polymerization test was conducted by mixing 2.0 g. of β-priopiolactone, 2.0 g. of toluene and 1.2 mg. of potassium acetate and leaving the mixture at 50°C. for 24 hours. The resulting polymer was washed with methanol, dried under a reduced pressure and then the intrinsic viscosity was measured at 30°C. with a chloroform solvent.

Table 3

| Oxide | Intrinsic viscosity (dl./g.) | Oxide | Intrinsic viscosity (dl./g.) |
| --- | --- | --- | --- |
| Not added | 0.05 | MgO | 1.5 |
| PbO | 2.5 | WO$_2$ | 2.2 |
| BeO | 2.4 | Cr$_2$O$_3$ | 1.8 |
| CaO | 2.0 | V$_2$O$_5$ | 2.0 |
| MnO | 2.0 | SrO | 2.0 |
| CdO | 2.0 | BaO | 1.9 |
| Al$_2$O$_3$ | 2.4 | B$_2$O$_3$ | 2.3 |
| Sb$_2$O$_3$ | 2.2 | ZnO | 2.1 |
| Silica-alumina | 2.2 | Silica-boria | 2.1 |

As evident also from the above results, the purification effect of the oxides according to the present invention are excellent.

EXAMPLE 4

To 100 g. of pivalolactone purified with lead monoxide (PbO) in Example 1 were added 6 g. of acetic acid (as an impurity) in an equivalent of 10 mol % of said pivalolactone and 25 g. of lead monoxide PbO, and the amount of the acetic acid (impurity) in said β-lactone was measured with a gas chromatography. The acetic acid content reduced to 5 mol % in 10 minutes and to such trace as could not be detected with a gas chromatography in 30 minutes. Then 6 g. of acetic acid were further added to this system, but no more reduction in the amount of acetic acid occurred even after 30 minutes. This indicates that the lead monoxide had already been modified to lose the ability of removing acetic acid.

Then lead monoxide was recovered by filtration and was then heated at 500° to 800°C. to regenerate lead monoxide having an activity. The regenerated lead monoxide was again used to purify the lactone, which was then subjected to the polymerization test mentioned in Example 1. There was obtained a high molecular weight polymer of an intrinsic viscosity of 5.85.

Thus, it is possible to regenerate and reuse the oxides. This is industrially significance in view of economical advantage. The same regeneration and reuse were also possible in respect of other oxides than lead monoxide.

EXAMPLE 5

There were charged 10 g. of pivalolactone and 0.1 g. of each of powdery oxides into a test tube, and the mixture was stirred and then left standing.

Then each test tube was dipped in a thermostatic oil bath and was kept at a temperature of 30°C. or 100°C. Then the time required until a white turbidity due to polymerization was observed was measured. The results are shown in Table 4.

Table 4

| Oxide | Time until start of polymerization | |
| --- | --- | --- |
| | 100°C. | 30°C. |
| None | 30 mins. | 5 days |
| BeO | 11 days | More than 6 months |
| MgO | 15 " | " |
| CaO | 14 " | " |
| MnO | 15 " | " |
| Al$_2$O$_3$ | 11 " | " |
| B$_2$O$_3$ | 10 " | " |
| Sb$_2$O$_3$ | 10 " | " |
| ZnO | 10 " | " |
| No$_2$O$_3$ | 15 " | " |
| As$_2$O$_3$ | 9 " | " |
| Silica-alumina | 15 " | " |
| Silica-boria | 15 " | " |
| SeO | 5 " | " |
| AgO | 4 " | " |
| NiO | 3 " | " |
| CuO | 2 " | " |

As apparent from the above results; even in the absence of catalyst, the β-lactone causes a self-polymerization at 30°C. and 100°C. However, when the oxide is added, such self-polymerization is prevented over a long time. Therefore, the oxide of the present invention serves not only as a purification agent but also as a stabilizer for β-lactones.

EXAMPLE 6

There were charged 200 liters of the crude pivalolactone as produced in Example 1 containing impurities into a cylindrical container which was made of aluminum and in which a film of aluminum oxide was formed on the inside surface. The lactone in the container was stored at the room temperature for 4 months but no formation of a polymer was observed. After storing for 4 months, the lactone was analyzed with a gas chromatography, but no presence of impurities was recognized. When the polymerization test was conducted under the same conditions as in Example 1, the intrinsic viscosity of the resulting polymer was 4.70 dl./g.

The same crude lactone was also stored in the same manner as mentioned above except that a cylindrical container made of stainless steel and in which 2.0 kg. of boron oxide were uniformly applied to coat the inside surface was used instead of the above mentioned aluminum made container coated with a film of aluminum oxide. After storing for 4 months the lactone was analyzed with a gas chromatography, but no presence of impurities was recognized. Further, when the polymerization test was conducted under the same conditions, the intrinsic viscosity of the polymer was 4.75 dl./g.

For comparison, the same procedure was repeated except that a container made of stainless steel but not coated with boron oxide was used as a container. In this case, the amount of impurities after the storing for 4 months was 0.48 %. The intrinsic viscosity of the polymer was 2.20 dl./g. It was also recognized that a large amount of the polymer had been formed in 10 days of the storing.

EXAMPLE 7

5 g. of potassium permangate were added to 1.0 kg. of pivalolactone containing 0.6 % by weight of a mixture of isobutylene chlorinate and others as impurities and showing an intrinsic viscosity of 1.60 dl./g. by the above mentioned polymerization test, and the mixture was left at the room temperature of 15°C. for 20 hours while being sometimes stirred. In this case, when potassium permanganate was initially added, a part of it dissolved in the pivalolactone and exhibited a reddish purple color but, after a while, the color disappeared. This indicates that the potassium permanganate was reduced. Then the mixture was flash-distilled to fractionate the pivalolactone, which was obtained at a yield of 96 %. The amount of impurities in the resulting pivalolactone was analyzed. in the resulting pivalolactone was 0.0004 %. The polymerization test indicated the intrinsic viscosity of 5.30 dl./g.

Further, the above purified pivalolactone was again distilled by using a rectifying tower charged with stainless steel wires. The content of impurities was in the resulting product 0.0002 %. When the polymerization test was made in respect thereof a polypivalolactone of an intrinsic viscosity of 5.57 dl./g. was obtained. From these results, it is shown that, when treated by the method of the present invention, only a simple subsequent flash-distillation would be sufficient to remove impurities.

For comparison, the above mentioned pivalolactone containing impurities was distilled by using a distilling tower of 30 cm. without being previously treated with potassium permanganate. When the fractionated pivalolactone was analyzed, the content of impurities was 0.51 % by weight. Further, when a polymerization test was conducted, a polypivalolactone having an intrinsic viscosity of 1.72 dl./g. was obtained. As evident also from this result, the pivalolactone can not be purified with only distillation.

EXAMPLE 8

There were added 2 g. of potassium permanganate of 2 g. of potassium permanganate and 2 g. of each of the below mentioned inorganic salts to pivalolactone containing impurities and giving an intrinsic viscosity of 1.91 dl./g. upon the above mentioned polymerization test. The mixture was left standing at the room temperature of 15°C. while being sometimes stirred. Then the treated mixture was flash-distilled to fractionate the pivalolactone. The amount of impurities in the resulting pivalolactone was analyzed. Its polymerization test was also conducted. The results are shown in Table 5.

Further, for comparison, the same procedure was repeated except that only the inorganic salt was added to the pivalolactone containing impurities. These results are also indicated in Table 5.

Table 5

| No. | Potassium permanganate | Inorganic salt | Amount of inorganic salt | Treating (contact) time | Distillation yield (%) | Intrinsic viscosity (dl./g.) | Impurity content (%) |
| --- | --- | --- | --- | --- | --- | --- | --- |
| 1 | Not added | Not added | 0 | 0 | 99.0 | 1.98 | 0.45 |
| 2 | Added | Not added | " | 1 day | 98.0 | 5.09 | 0.0004 |
| 3 | Added | Not added | " | 4 days | 80.0 | 6.14 | 0.0003 |
| 4 | Added | Cupric chloride | 2 g. | " | 98.0 | 5.81 | 0.0003 |
| 5 | Added | Zinc chloride | " | " | 97.0 | 5.79 | 0.0003 |
| 6 | Added | Cupric nitrate | " | " | 98.0 | 5.68 | 0.0003 |
| 7 | Added | Zinc nitrate | " | " | 98.0 | 5.69 | 0.0003 |
| 8 | Added | Bismuth nitrate | " | " | 97.0 | 5.54 | 0.0003 |
| 9 | Not added | Cupric chloride | 5 g. | " | 99.0 | 1.98 | 0.45 |
| 10 | Not added | Zinc chloride | " | " | 97.0 | 2.03 | 0.41 |
| 11 | Not added | Cupric nitrate | " | " | 97.0 | 1.95 | 0.42 |
| 12 | Not added | Bismuth nitrate | " | " | 98.0 | 2.00 | 0.42 |
| 13 | Not added | Zinc nitrate | " | " | 98.0 | 1.98 | 0.43 |

As apparent also from the above results, in case potassium permanganate is added, when the treating time is long, the distillation yield of the pivalolactone reduces and the consumption of the pivalolactone during the treatment increases. But, in case potassium permanganate and the inorganic salt are added, even if the treating time is long, there is no consumption of the pivalolactone and pivalolactone of a high purity can be obtained at a high yield. Further, with the addition of only the inorganic salt, no purification effect can be obtained.

EXAMPLE 9

1 g. of potassium permanganate and 1 g. of cupric chloride were added to 500 g. of the same pivalolactone as in Example 8 containing impurities and the mixture was heated at 60°C. for 90 minutes while passing air under the normal pressure. No formation of a polymer was observed.

The pivalolactone was distilled at a fractionating velocity of 1 liter per hour under a pressure of 12 mm. Hg. The content of the impurities in the resulting product was 0.0003 %. Further, when polymerization test was conducted in the same manner as mentioned before, the intrinsic viscosity was 6.1 dl./g. The distillation yield was 97 % and no loss of the pivalolactone due to polymerization during the purification stage was seen.

For comparison, pivalolactone was treated and distilled under the same conditions except that no cupric chloride was added. The resulting pivalolactone contained impurities of 0.0003 % by weight. The intrinsic viscosity of the polymer produced therefrom was 6.0 dl./g. Thus the effect of the purification was evident but the distillation yield was 90 % indicating some loss of the pivalolactone by the polymerization during the purification treatment.

EXAMPLE 10

The pivalolactone containing impurities as in Example 9 was rectified at a fractionating velocity of 1 liter per hour under a pressure of 12 mm. Hg by using a rectifying tower of 70 cm. This operation was repeated twice. The resulting pivalolactone was of an impurity content of 0.0004 % by weight. Upon polymerization test, the intrinsic viscosity was 3.50 dl./g. In this case, the initial distillate and residue were discarded and therefore the yield of the purified pivalolactone was 60 %.

The above mentioned pivalolactone obtained by rectifying twice was purified according to the present invention under the same conditions as in Example 9 and was then distilled. The distillation yield was 97 % and its impurity content was 0.0002 % by weight. Upon polymerization test, a polypivalolactone of an intrinsic viscosity of 6.8 dl./g. was obtained.

As evident also from the above results and also from the results obtained in Example 8, according to the method of the present invention, an excellent purification effect can be obtained even for pivalolactone from which impurities can not be well separated with only rectification.

EXAMPLE 11

There were added 2 g. of potassium permanganate and 2 g. of bismuth nitrate to 1 kg. of α-phenyl-α-methyl-β-propiolactone containing, as impurities, 0.5 % weight of a mixture of α-methyl styrene and its chlorinate, 0.1 % by weight α-phenyl-α-methyl propionic acid and 0.8 % by weight of a chlorinate mixture of α-phenyl-α-methyl propionic acid. The mixture was stirred at 20°C. and was then left standing for 12 hours. Then this mixture was flash-distilled to separate α-phenyl-α-methyl-β-propiolactone at a distillation yield of 96 %. Its impurity content was 0.0003 % by weight. The polymer obtained by the polymerization test was of an intrinsic of 4.20 dl./g. On the other hand, the polymer obtained by the polymerization test of the unpurified monomer was of an intrinsic viscosity of 0.75 dl./g.

EXAMPLE 12

There were added 2 g. of potassium permanganate and 2 g. of cupric chloride to 1 kg. of α,α-diethyl-β-propiolactone containing, as impurities, 0.3 % by weight α,α-diethyl propionic acid and 0.3 % by weight of a mixture of 2- ethyl-1- butene and its chlorinate. The mixture was stirred at 20°C. and was then left standing for 12 hours. Then this mixture was flash-distilled to separate α,α-diethyl-β-propiolactone at a distillation yield of 96 % by weight. Its content of impurities was 0.0002 % by weight. The polymer obtained by the polymerization test was of an intrinsic viscosity of 4.58 dl./g. On the other hand, the polymer obtained by the polymerization test of the unpurified monomer was of an intrinsic viscosity of 0.82 dl./g.

EXAMPLE 13

There were added 2 g. of potassium permanganate and 2 g. of bismuth nitrate to 1 kg. of β-propiolactone containing 0.3 % by weight of ketone dimer and 0.1 % by weight of acetic anhydride as impurities. The mixture was stirred at 20°C, and then left standing for 12 hours. Then the mixture was flash-distilled to recover β-propiolactone at a yield of 97 % by weight. It content of impurity ions 0.0005 % by weight. The polymer obtained by the polymerization test had an intrinsic viscosity of 2.1 dl./g., while the polymer obtained from the unpurified monomer had an intrinsic viscosity of 0.05 dl./g.

What we claim is:

1. A method for purifying a β-lactone represented by the formula:

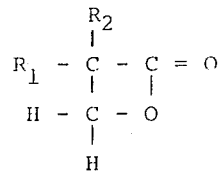

wherein each of $R_1$ and $R_2$ represent hydrogen, alkyl of 1 to 4 carbon atoms or phenyl, and having impurities selected from the group consisting of carboxylic acids, aldehydes, chlorinated olefins, ketenes, ketene dimers and olefine, which consist essentially of the step of contacting the impure β-lactone with at least one substance selected from the group consisting of (1) a metal oxide selected from the group consisting of berylium oxide, magnesium oxide, calcium oxide, strontium oxide, barium oxide, lead monoxide, manganese oxide, cadmium oxide, tungsten dioxide, chromium trioxide, vanadium pentoxide, molybdenum trioxide, nickelous oxide, cuprous oxide, zinc oxide, aluminum oxide, antimony trioxide, stannous oxide, silverous oxide, red lead, ferric oxide, ceric oxide, zirconium oxide, bismuth trioxide and titanium dioxide, (2) a non-metal oxide selected from the group consisting of boron oxide, silicon oxide, selenium oxide and arsenic trioxide, (3) a mixture of metal and non-metal oxide selected from the group consisting of silica-alumina, silica-zirconia, silica-boria, acid clay, bentonite, kaolin and montmorillonite, (4) potassium permanganate and (5) a mixture of potassium permanganate and at least one metal salt selected from the group consisting of cupric chloride, zinc chloride, cupric nitrate, zinc nitrate and bismuth nitrate; said substance being employed in an amount of 0.05 to 100 % by weight based on the weight of β-lactone; said contacting being conducted at a temperature of between −10°C and 150°C; said substance being in the form of a powder, granule or lump.

2. A method according to claim 1 wherein the metal oxides are berylium oxide, magnesium oxide, calcium oxide, strontium oxide, barium oxide, lead monoxide, manganese oxide, cadmium oxide, tungsten dioxide, chromium trioxide, vanadium pentoxide, molybdenum trioxide, nickelous oxide, cuprous oxide, zinc oxide, aluminum oxide, antimony trioxide, stannous oxide, silverous oxide, red lead, ferric oxide, ceric oxide, zirconium oxide, bismuth trioxide and titanium dioxide.

3. A method according to claim 1 wherein the non-metal oxides are boron oxide, silicon oxide, selenium oxide and arsenic trioxide.

4. A method according to claim 1 wherein said substance to be contacted with β-lactone is used in an amount of 0.1 -50 % by weight based on the β-lactone.

5. A method according to claim 1 wherein the substance to be contacted with the β-lactone is selected from silica-alumina, silica-zirconia, silica-boria, acid clay, bentonite kaolin and montmorillonite.

6. A method according to claim 1 wherein the contact is conducted at a temperature of 10° – 60°C.

7. A method according to claim 1 wherein the salt is selected from cupric chloride, zinc chloride, cupric nitrate, zinc nitrate or bismuth nitrate.

8. A method according to claim 1 wherein the potassium permanganate is employed in an amount of 0.01 – 10 % by weight based on the weight of the β-lactone.

9. A method according to claim 1 wherein the salt is employed in an amount of 0.01 – 10 %, by weight based on the weight of the β-lactone.

10. A method according to claim 1 wherein β-lactone is separated from the permanganate or a mixture of the permanganate and salt by distillation after the purification.

11. A method according to claim 1, wherein the potassium permanganate is employed in an amount of 0.1 to 1% by weight based on the weight of the β-lactone.

12. A method according to claim 1, wherein the salt is employed in an amount of 0.1 to 5% by weight based on the weight of the β-lactone.

13. A method according to claim 1 wherein the substrate contacting the impure β-lactone is a powdery form.

* * * * *